(12) United States Patent
Lundberg et al.

(10) Patent No.: US 9,957,943 B2
(45) Date of Patent: May 1, 2018

(54) ENGINE CRANKING CONTROL SYSTEMS AND METHODS USING ELECTRONIC TRANSMISSION RANGE SELECTION

(71) Applicant: GM Global Technology Operations LLC, Detroit, MI (US)

(72) Inventors: Philip C. Lundberg, Keego Harbor, MI (US); Dustin Nygaard, Novi, MI (US); Brian Hanselman, Milford, MI (US)

(73) Assignee: GM GLOBAL TECHNOLOGIES OPERATIONS LLC, Detroit, MI (US)

( * ) Notice: Subject to any disclaimer, the term of this patent is extended or adjusted under 35 U.S.C. 154(b) by 353 days.

(21) Appl. No.: 14/748,948

(22) Filed: Jun. 24, 2015

(65) Prior Publication Data
US 2016/0333841 A1 Nov. 17, 2016

Related U.S. Application Data
(60) Provisional application No. 62/160,790, filed on May 13, 2015.

(51) Int. Cl.
*F16H 63/50* (2006.01)
*F16H 61/04* (2006.01)
(Continued)

(52) U.S. Cl.
CPC ............ *F02N 11/103* (2013.01); *F16H 63/50* (2013.01); *F16H 59/70* (2013.01); *F16H 2063/504* (2013.01)

(58) Field of Classification Search
CPC ............. Y10T 477/669; Y10T 477/675; Y10T 477/60; Y10T 477/6414; Y10T 477/6422;
(Continued)

(56) References Cited

U.S. PATENT DOCUMENTS 5,265,018 A * 11/1993 Sokol .................. F16H 61/0248
192/32
5,997,434 A 12/1999 Graf et al.
(Continued)

FOREIGN PATENT DOCUMENTS

CN 101070805 A 11/2007
CN 101513873 A 8/2009
(Continued)

OTHER PUBLICATIONS

First Office Action for Chinese Application No. 201610302595.5 dated Feb. 2, 2018 with English language translation; 12 pages.

*Primary Examiner* — Ramya Burgess
*Assistant Examiner* — Lillian Nguyen

(57) ABSTRACT

A crank permission system includes first and second permission modules and a crank module. The first permission module selectively generates a first permission signal, based on a first gear range engaged within a transmission, when an ignition system transitions to crank. The second permission module selectively generates a second permission signal, based on (i) the first gear range stored when the ignition system last transitioned to off and (ii) a second gear range of the transmission requested by a driver using a transmission range selector, when the ignition system transitions to crank. The crank module begins cranking an engine via a starter, in response to the generation of at least one of the first and second permission signals, when the ignition system of the vehicle transitions to crank.

17 Claims, 4 Drawing Sheets

(51) Int. Cl.
*F02N 11/10* (2006.01)
*F16H 59/70* (2006.01)

(58) Field of Classification Search
CPC ........... Y10T 74/19242; Y10T 74/1926; F02N 11/103; F16H 63/50; F16H 59/70; F16H 2063/504
See application file for complete search history.

(56) References Cited

U.S. PATENT DOCUMENTS

| | | | | |
|---|---|---|---|---|
| 8,219,291 | B2* | 7/2012 | Yabes | B60W 10/06 180/269 |
| 9,039,571 | B2* | 5/2015 | Doering | F02D 41/0215 477/101 |
| 2008/0242506 | A1* | 10/2008 | Hori | F02N 11/0803 477/165 |

FOREIGN PATENT DOCUMENTS

| | | |
|---|---|---|
| CN | 104153897 A | 11/2014 |
| DE | 102013219922 A | 4/2015 |
| WO | WO-2011039767 A2 | 4/2011 |

* cited by examiner

US 9,957,943 B2

ENGINE CRANKING CONTROL SYSTEMS AND METHODS USING ELECTRONIC TRANSMISSION RANGE SELECTION

CROSS-REFERENCE TO RELATED APPLICATIONS

This application claims the benefit of U.S. Provisional Application No. 62/160,790, filed on May 13, 2015. The disclosure of the above application is incorporated herein by reference in its entirety.

FIELD

The present disclosure relates to vehicles, and more particularly to systems and methods for controlling engine cranking in a vehicle having electronic transmission range selection.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Transmission range selection involves a driver selecting a gear range such as park, reverse, neutral, drive, low, or overdrive, for example. A vehicle typically includes a shifter assembly that is manipulated by the driver to select the gear range. The selected gear range may be transmitted to an engine control module (ECM) and a transmission control module (TCM). The TCM may control the engagement of gears and/or a clutch based on the selected gear range.

The ECM receives inputs from one or more sensors and controls one or more operating parameters of an engine. The ECM applies power to a starter such that the starter starts the engine when the transmission is in a valid gear range.

SUMMARY

According to one aspect, the present disclosure provides a crank permission system for a vehicle. The crank permission system may include first and second permission modules and a crank module. The first permission module may selectively generate a first permission signal, based on a first gear range engaged within a transmission, when an ignition system transitions to crank. The second permission module may selectively generate a second permission signal, based on (i) the first gear range stored when the ignition system last transitioned to off and (ii) a second gear range of the transmission requested by a driver using a transmission range selector, when the ignition system transitions to crank. The crank module may begin cranking an engine via a starter, in response to the generation of at least one of the first and second permission signals, when the ignition system of the vehicle transitions to crank.

In some configurations, the second permission module selectively generates the second permission signal further based on whether the first gear range is invalid when the ignition system of the vehicle transitions to crank.

In some configurations, the second permission module selectively generates the second permission signal further based on the first gear range before when the engine last transitioned to off.

In some configurations, the second permission module selectively generates the second permission signal further based on whether the engine was running when the first gear range reached park before the ignition system last transitioned to off.

In some configurations, when the ignition system of the vehicle transitions to crank, the second permission module generates the second permission signal when all of (i) the first gear range stored when the ignition system last transitioned to off is park, (ii) the second gear range of the transmission requested by the driver is one of park and neutral, (iii) the first gear range is invalid and is not one of park, neutral, drive, reverse, and low, (iv) the first gear range when the engine last transitioned to off is park, and (v) the engine was running when the first gear range reached park before when the ignition system last transitioned to off.

In some configurations, the second permission module does not generate the second permission signal when at least one of (vi) the first gear range stored when the ignition system last transitioned to off is not park, (vii) the second gear range of the transmission requested by the driver is not one of park and neutral, (viii) the first gear range is one of park, neutral, drive, reverse, and low, (ix) the first gear range when the engine last transitioned to off is not park, and (x) the engine was not running when the first gear range reached park before when the ignition system last transitioned to off.

In some configurations, after beginning to crank the engine in response to the generation of at least one of the first and second signals, the crank module continues to crank the engine after the generation of the at least one of the first and second signals has stopped.

In some configurations, the system includes a shifter control module that determines the second gear range of the transmission requested by the driver based on at least one position of the transmission range selector.

In some configurations, the system includes a transmission control module that determines the first gear range.

In some configurations, when the ignition system of the vehicle transitions to crank, the first permission module generates the first permission signal when the first gear range is in one of park and neutral.

According to another aspect, the present disclosure provides a method for permitting cranking of an engine. The method may include selectively generating a first permission signal based on a first gear range engaged within a transmission. The method may also include selectively generating a second permission signal based on (i) the first gear range stored when an ignition system last transitioned to off and (ii) a second gear range of the transmission requested by a driver using a transmission range selector. The method may further include cranking the engine via a starter in response to the generation of at least one of the first and second permission signals.

In some configurations, selectively generating the first and second permission signals includes selectively generating the first and second permission signals when the ignition system transitions to crank.

In some configurations, the method includes determining whether the first gear range is invalid when the ignition system transitions to crank.

In some configurations, the method includes determining the first gear range when the engine last transitioned to off.

In some configurations, the method includes determining whether the engine was running when the first gear range reached park before when the ignition system last transitioned to off.

In some configurations, selectively generating the second permission signal includes selectively generating the second permission signal when all of (i) the first gear range stored when the ignition system last transitioned to off is park, (ii) the second gear range of the transmission requested by the driver is one of park and neutral, (iii) the first gear range is invalid and is not one of park, neutral, drive, reverse, and low, (iv) the first gear range when the engine last transitioned to off is park, and (v) the engine was running when the first gear range reached park before when the ignition system last transitioned to off.

In some configurations, selectively generating the second permission signal includes not generating the second permission signal when at least one of (vi) the first gear range stored when the ignition system last transitioned to off is not park, (vii) the second gear range of the transmission requested by the driver is not one of park and neutral, (viii) the first gear range is one of park, neutral, drive, reverse, and low, (ix) the first gear range when the engine last transitioned to off is not park, and (x) the engine was not running when the first gear range reached park before when the ignition system last transitioned to off.

In some configurations, the method includes cranking the engine after the generation of the at least one of the first and second signals has stopped.

In some configurations, the method includes determining the second gear range of the transmission requested by the driver based on at least one position of the transmission range selector.

In some configurations, generating the first permission signal includes generating the first permission signal when the first gear range is one of park and neutral.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An engine outputs torque to a transmission having a plurality of transmission gear ranges, such as park, neutral, reverse, low, and drive. A transmission control module (TCM) reports an actual gear range of the transmission. A starter engages the engine to crank and start the engine when the actual gear range of the transmission is in a predetermined range, such as park or neutral. The engine may be started, for example, when a driver of the vehicle actuates an ignition key, button, or switch.

An electronic transmission range selection system allows the driver to request a gear range for the transmission. In particular, the driver may request the gear range using a range selection module. A shifter control module generates a requested gear range for the transmission based on the driver's input to the range selection module.

According to the present disclosure, engine cranking may be performed based on the actual gear range and/or the requested gear range of the transmission. More specifically, based on the requested gear range and the actual gear range when the engine was last shut down, engine cranking may be performed when the actual gear range is unavailable. For example, engine cranking may be performed when the requested gear range is park or neutral, the TCM reports an actual gear range that is invalid, and the actual gear range in the transmission when the engine was last shut down was park or neutral. This enables engine cranking to be performed despite the TCM not reporting that the actual gear range of the transmission is park or neutral.

Figure 1:
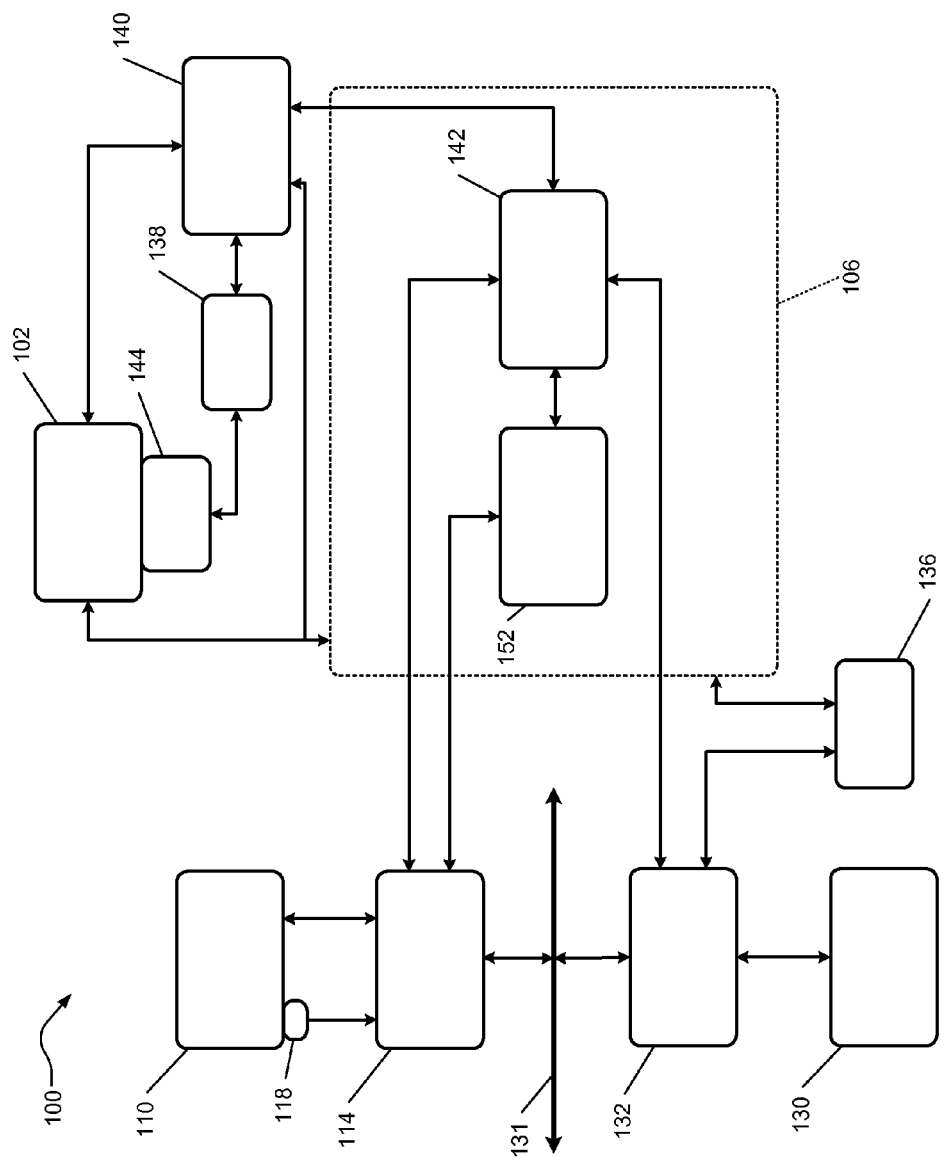
FIG. 1 is a functional block diagram of an example of an electronic transmission range selection system according to the present disclosure.

Referring now to FIG. 1, a functional block diagram of an example vehicle system 100 is presented. The vehicle system 100 includes a crank permission system for an electronic transmission range selection system.

The vehicle system 100 includes an engine 102 that combusts an air/fuel mixture to generate drive torque. An engine control module (ECM) 106 controls and adjusts operating parameters of the engine 102. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators.

The engine 102 outputs torque to a transmission 110. A transmission control module (TCM) 114 controls and adjusts operating parameters of the transmission 110. In particular, the TCM 114 may control a gear range selection (i.e., an actual gear range) within the transmission 110 and one or more torque transfer devices (e.g., a torque converter, one or more clutches, etc.). One or more sensors 118 may be coupled to the transmission 110 to determine the actual gear range for the transmission 110. The sensors 118 may include, for example, gear position sensors, pressure sensors, speed sensors (e.g., transmission input shaft speed, transmission output shaft speed, and/or wheel speed), or other suitable sensors. The TCM 114 determines the actual gear range based on the signals from the sensors 118. The actual gear range may be one of a plurality of valid gear ranges such as park, neutral, reverse, drive, manual, or low, for example.

The TCM 114 may communicate the actual gear range to the ECM 106 using a controller area network (CAN) data bus 131, a local interconnect network (LIN) data bus, or another suitable data bus. The actual gear range may be stored at predetermined events, such as engine shutdown and vehicle shutdown. One or more stored actual gear ranges may be used to allow cranking of the engine 102.

A range selection module 130 allows a driver to request a gear range for the transmission 110. In particular, the range selection module 130 allows the driver to request or otherwise select a gear range such as park, neutral, reverse, drive, or manual, for example. In this regard, the range selection module 130 may include various configurations of a driver interface, such as a plurality of buttons, a knob or dial, a lever, a touchscreen, or other suitable range selection device. For example, the range selection module 130 may include individual buttons and/or actuator positions corresponding to reverse, neutral, park, drive, manual, or low range modes, although other range selections may be provided.

The range selection module 130 generates signals based on driver input to the range selection module 130. A shifter control module 132 determines which gear range has been requested (i.e., a requested gear range) based on the signals received from range selection module 130.

The shifter control module 132 provides the requested gear range to the TCM 114. The TCM 114 may control the transmission 110 based on the requested gear range. The shifter control module 132 may provide the requested gear range to the TCM 114 and other modules via the CAN 131 or the LIN.

The ECM 106 or the shifter control module 132 may output indicator signals to identify the requested gear range to an indicator 136 that includes a display or individual lights (not shown) corresponding to park, reverse, neutral, drive, manual, and/or low gear ranges.

A driver may actuate an ignition key, button, switch, or other suitable device to control a power mode of an ignition module 138. At a given time, the power mode of the ignition module 138 may be one of off, accessory, run, or crank. The ignition module 138 may provide the power mode of the ignition module 138 to a body control module (BCM) 140. The BCM 140 may, in turn, provide the power mode of the ignition module 138 to the ECM 106 which can selectively control the operation of the engine 102.

A crank permission module 142 controls whether the engine 102 can be cranked and started. In particular, based on the power mode of the ignition module 138, the requested gear range of the transmission 110, and/or one or more of the stored actual gear ranges of the transmission 110, the crank permission module 142 controls whether a starter 144 can crank the engine 102. In one example, when the ignition module 138 is in the crank power mode, the crank permission module 142 may generate a crank permission signal. The crank permission signal indicates whether cranking is permitted or prohibited. The BCM 140 may control the starter 144 to crank the engine 102 based on the crank permission signal. In another example, in the run power mode of the ignition module 138, the BCM 140 may communicate the power mode of the ignition module 138 to the ECM 106 to maintain the engine 102 in a running or operational state.

Figure 2:
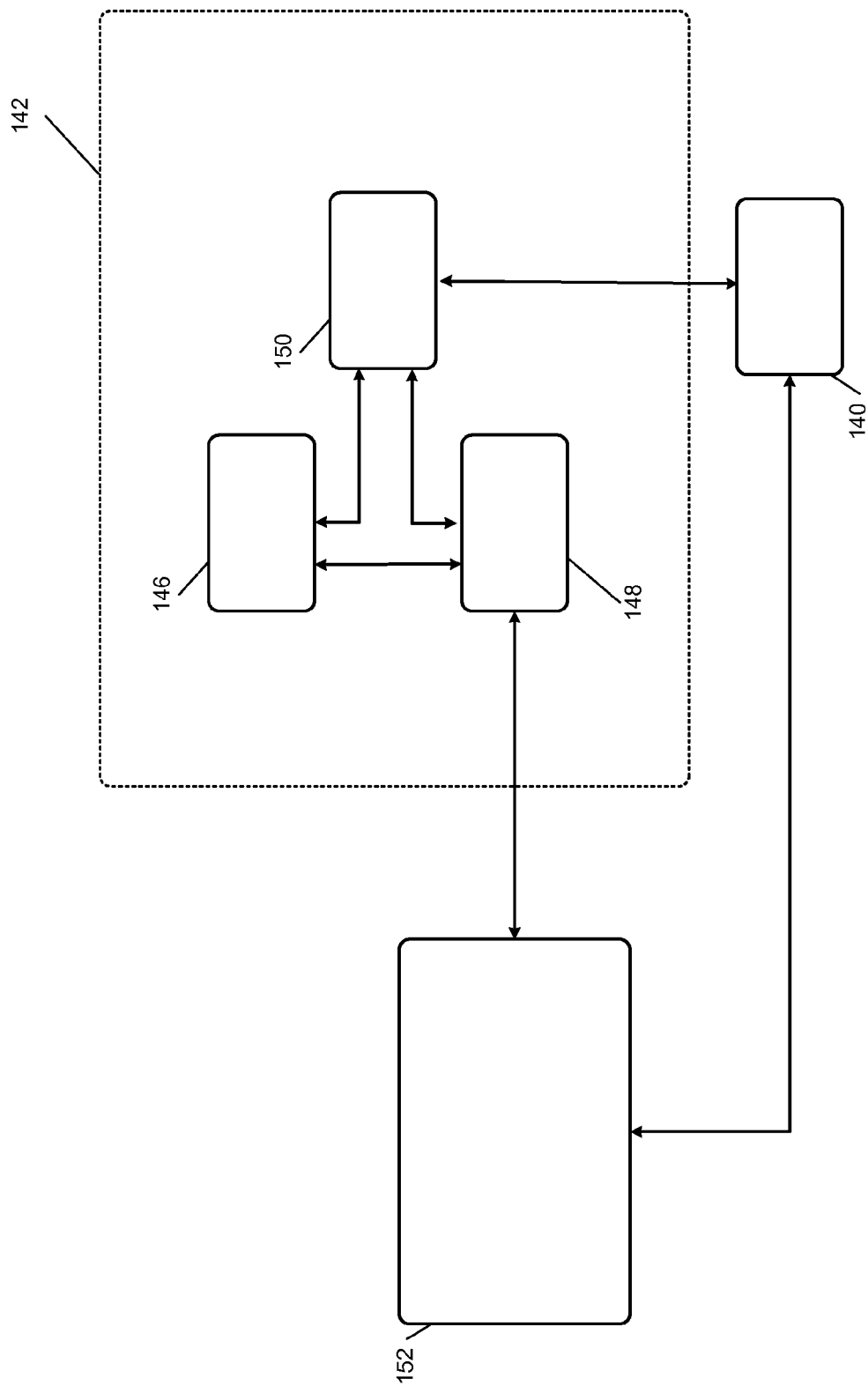
FIG. 2 is a functional block diagram of an example of a permission module according to the present disclosure.

Referring now to FIG. 2, a functional block diagram of an example implementation of the crank permission module 142 is presented. The crank permission module 142 includes a first permission module 146, a second permission module 148, and a crank module 150. The crank module 150 generates the crank permission signal based on first and second permission signals generated by the first and second permission modules 146 and 148.

When the power mode of the ignition module 138 transitions to crank, the first permission module 146 generates the first permission signal based on the actual gear range of the transmission 110. The first permission signal indicates whether or not cranking is permitted based on the actual gear range reported by the TCM 114. For example, when the actual gear range is one of park and neutral, the first permission module 146 generates the first permission signal to indicate that cranking of the engine 102 is permitted. The first permission module 146 generates the first signal to indicate that cranking is not permitted when the actual gear range is not one of park and neutral.

When the power mode of the ignition module 138 transitions to crank, the second permission module 148 generates the second permission signal based on the requested gear range, the actual gear range reported by the TCM 114, and/or one or more stored actual gear ranges. The second permission signal indicates whether or not cranking is permitted based on the requested gear range and other parameters indicative of the transmission 110 being in park or neutral.

Regarding stored actual gear ranges, the ECM 106 may include a storing module 152 (see FIG. 1) that stores one or more actual gear ranges reported by the TCM 114 when predetermined events occur. In this regard, the ECM 106 may continually update the stored actual gear range until predetermined events occur, store the last known actual gear range upon the occurrence of the predetermined events. For example, the storing module 152 may store the actual gear range reported by the TCM 114 when the power mode of the ignition module 138 transitions from run to off. The actual gear range stored when the power mode of the ignition module 138 transitions from run to off may be referred to as a last engine shutdown actual gear range. While this actual gear range may be referred to as the last engine shutdown actual gear range, in some vehicles, the engine 102 may be shut down (e.g., to decrease fuel consumption) before the power mode transitions from run to off or accessory. The storing module 152 may also therefore store whether the engine 102 was running when the power mode transitioned to off and/or when the actual gear range last transitioned to park or neutral before the power mode transitioned to off.

The storing module 152 may also store one or more other actual gear ranges, such as the actual gear range reported by the TCM 114 when the vehicle shuts down. Vehicle shutdown may occur a predetermined period after the power mode transitions to off. The actual gear range reported by the TCM 114 at vehicle shutdown may refer to the last vehicle shutdown actual gear range.

When the power mode of the ignition module 138 transitions to crank, the second permission module 148 generates the second permission signal to indicate that cranking is permitted when: (i) the actual gear range reported by the TCM 114 is invalid; (ii) the requested gear range is park or neutral; (iii) the last engine shutdown actual gear range is park; (iv) the last vehicle shutdown actual gear range is park; and (v) the engine 102 was running when the actual gear range reached park before the power mode last transitioned to off. The second permission module 148 generates the second permission signal to indicate that cranking is not permitted when at least one of (i)-(v) is not met. In other words, the second permission module 148 generates the second permission signal to indicate that cranking is not permitted when at least one of: the actual gear range reported by the TCM 114 is a valid gear range other than park or neutral (i.e., one of drive, reverse, low, or manual); the requested gear range is not one of park or neutral; the last engine shutdown actual gear range is not park; the last vehicle shutdown actual gear range is not park; and the engine 102 was not running when the actual gear range reached park before the power mode last transitioned to off.

The crank module 150 generates the crank permission signal based on the power mode of the ignition module 138 and at least one of the first permission signal and the second permission signal. When the power mode of the ignition module 138 transitions to crank, indicating that the driver has requested to start the engine 102, the crank module 150 generates the crank permission signal when at least one of the first and second permission signals indicates that cranking is permitted. The crank module 150 prohibits cranking when both of the first and second permission signals indicate that cranking is not permitted.

The BCM 140 engages and powers the starter 144 to crank the engine 102 when the crank permission signal indicates that cranking of the engine 102 is permitted. The BCM 140 does not engage or power the starter 144 when the crank permission signal indicates that cranking of the engine 102 is not permitted.

Figure 3:
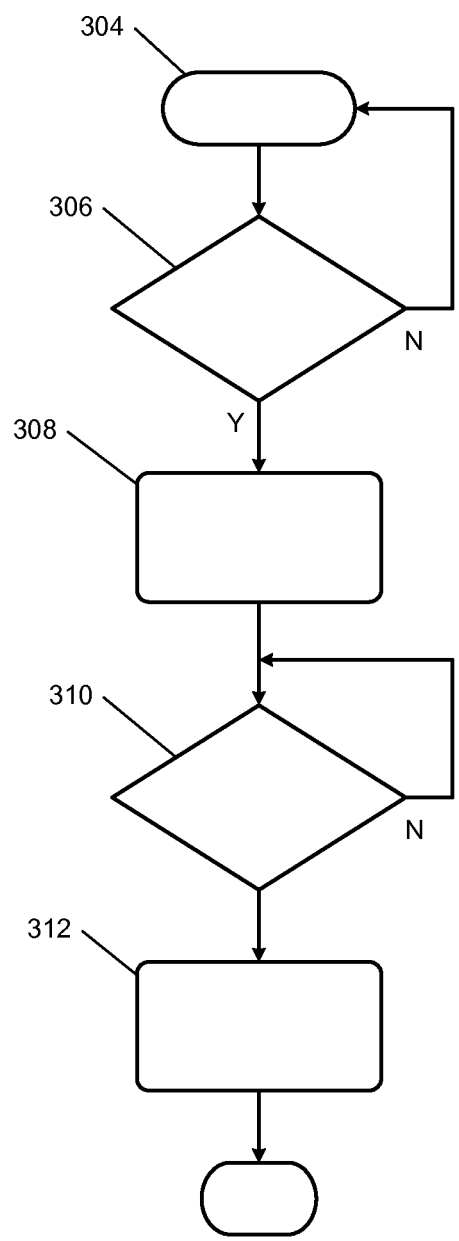
FIG. 3 is a flowchart depicting an example method for determining and storing an actual gear range of a transmission according to the present disclosure.

Referring now to FIG. 3, a flowchart depicting an example method of determining and storing one or more actual gear ranges of a transmission is presented. Control begins at 304 when the vehicle is on (i.e., power mode is in run). At 306, the storing module 152 determines whether the power mode of the ignition module 138 transitioned from "run" to "off." If 306 is false, control remains at 306. If 306 is true, control continues with 308 where the storing module 152 stores the actual gear range of the transmission 110 reported by the TCM 114 when the power mode transitioned to off. This stored actual gear range will serve as the last engine shutdown actual gear range when the driver next requests cranking of the engine 102. For example, at 308, the storing module 152 may store to memory the actual gear range received from the TCM 114 when the power mode of the ignition module 138 transitions from run to off. As discussed above, the storing module 152 also stores an indicator of whether the engine 102 was running when the actual gear range was park before the power mode transitioned to off.

At 310, the storing module 152 determines whether vehicle shutdown will occur. For example, the storing module 152 may determine whether a predetermined period has passed after the power mode transitioned to off at 310. If 310 is true, the storing module 152 stores the actual gear range of the transmission 110 reported by the TCM 114 at 312. This stored actual gear range will serve as the last vehicle shutdown actual gear range when the driver next requests cranking of the engine 102.

Figure 4:
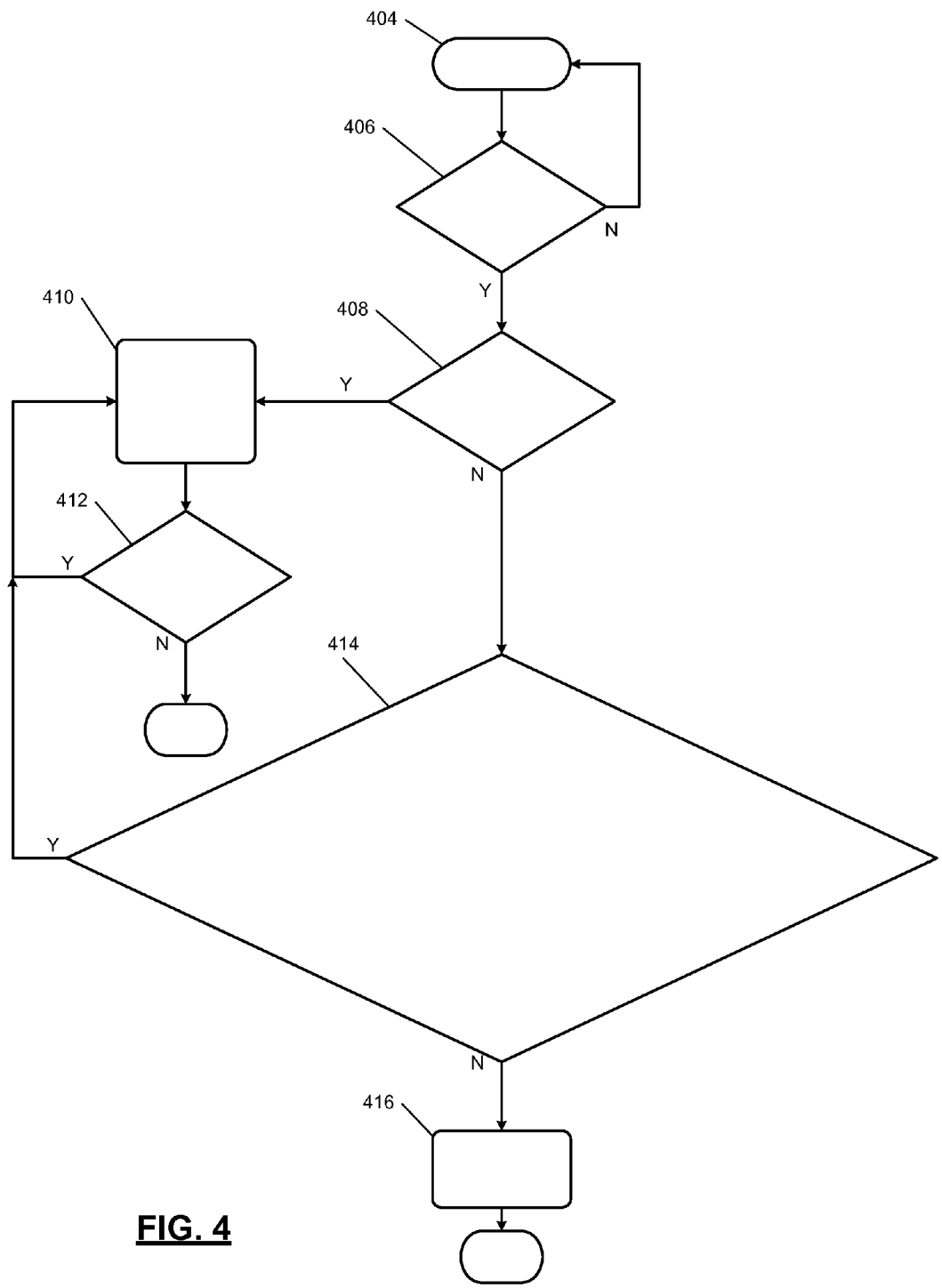
FIG. 4 is a flowchart depicting an example method for permitting engine cranking according to the present disclosure.

Referring now to FIG. 4, a flowchart depicting an example method of controlling cranking of an engine is presented. Control begins at 404 when the engine 102 is off. At 406, the crank module 150 determines whether power mode transitioned to crank. If 406 is false, control remains at 406. If 406 is true, control continues with 408 where the first permission module 146 determines whether the actual gear range of the transmission 110 is one of park or neutral.

If 408 is true, control continues with 410 where the first permission module 146 generates the first permission signal to permit cranking of the engine 102. The crank module 150 cranks the engine 102 via the starter 144 in response to the first permission module 146 generating the first permission signal to permit cranking. At 412, the crank module 150 again determines whether the power mode is in crank. If 412 is true, until the power mode of the ignition module 138 changes from crank to another power mode (e.g., run, accessory, off, etc.), the crank module 150 continues the cranking of the engine 102. In particular, the crank module 150 will control the starter 144 to permit cranking of the engine 102 even if the TCM 114 loses power, or otherwise stops communicating the actual gear range. If 412 is false, control may end.

If 408 is false, control continues with 414 where the second permission module 148 determines various parameters related to the engine 102, the transmission 110, and/or the range selection module 130. For example, the second permission module 148 may determine whether the actual gear range of the transmission 110 reported by the TCM 114 is an invalid range at 414. In this regard, valid ranges may include one of park, neutral, reverse, drive, manual, and low. The actual gear range reported by the TCM 114 may be invalid, for example, when the TCM 114 is not yet reporting the actual gear range or does not yet have enough information to determine the actual gear range.

The second permission module 148 may also determine whether the requested gear range of the transmission 110 is one of park or neutral at 414. The second permission module 148 may also determine whether the last engine shutdown actual gear range of the transmission 110 was park at 414. In other words, the second permission module 148 may determine whether the actual gear range reported by the TCM 114 when the power mode last transitioned to off was park.

The second permission module 148 may also determine whether the engine 102 was on when the actual gear range achieved park before the power mode last transitioned to off at 414. The second permission module 148 may also determine whether the last vehicle shutdown actual gear range of the transmission 110 was park at 414. In other words, the second permission module 148 may determine whether the actual gear range reported by the TCM 114 a predetermined period after the power mode last transitioned to off (i.e., at the last vehicle shutdown) was park.

If one or more of the above are false at 414, control continues with 416 where the second permission module 148 controls the starter 144 to not permit cranking. If all of the above conditions are true at 414, control continues to 410 where the second permission module 148 generates the second permission signal to permit cranking of the engine 102. The crank module 150 cranks the engine 102 via the starter 144 in response to the second permission module 148 generating the second permission signal to permit cranking. As described above, the crank module 150 continues the cranking of the engine 102 until the power mode of the ignition module 138 changes from crank to another power mode (e.g., run, accessory, off, etc.). This allows cranking to continue even if the TCM 114 loses power, or otherwise stops communicating the actual gear range such that one or more of the conditions for the first and/or second permission modules 146 and 148 would no longer generate its permission signal to permit cranking.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, driver applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A crank permission system of a vehicle, comprising:
   a first permission module that, when an ignition system of the vehicle transitions to crank, selectively generates a first permission signal based on a first gear range engaged within a transmission;
   a second permission module that, when the ignition system of the vehicle transitions to crank, selectively generates a second permission signal based on: (i) the first gear range stored when the ignition system last transitioned to off; (ii) a second gear range of the transmission requested by a driver using a transmission range selector; (iii) whether the first gear range is invalid when the ignition system of the vehicle transitions to crank; and (iv) the first gear range before an engine last transitioned to off; and
   a crank module that, when the ignition system of the vehicle transitions to crank, begins cranking the engine via a starter in response to the generation of the first permission signal and the generation of the second permission signal.

2. The crank permission system of claim 1 wherein the second permission module selectively generates the second permission signal further based on whether the engine was running when the first gear range reached park before the ignition system last transitioned to off.

3. The crank permission system of claim 2 wherein, when the ignition system of the vehicle transitions to crank, the second permission module generates the second permission signal when all of:
   (i) the first gear range stored when the ignition system last transitioned to off is park;
   (ii) the second gear range of the transmission requested by the driver is one of park and neutral;
   (iii) the first gear range is invalid and is not one of park, neutral, drive, reverse, and low;
   (iv) the first gear range when the engine last transitioned to off is park; and
   (v) the engine was running when the first gear range reached park before when the ignition system last transitioned to off.

4. The crank permission system of claim 3 wherein the second permission module does not generate the second permission signal when at least one of:
   (vi) the first gear range stored when the ignition system last transitioned to off is not park;
   (vii) the second gear range of the transmission requested by the driver is not one of park and neutral;
   (viii) the first gear range is one of park, neutral, drive, reverse, and low;
   (ix) the first gear range when the engine last transitioned to off is not park; and (x) the engine was not running when the first gear range reached park before when the ignition system last transitioned to off.

5. The crank permission system of claim 1 wherein, after beginning to crank the engine in response to the generation of at least one of the first and second permission signals, the crank module continues to crank the engine after the generation of at least one of the first and second permission signals has stopped.

6. The crank permission system of claim 1 further comprising a shifter control module that determines the second gear range of the transmission requested by the driver based on at least one position of the transmission range selector.

7. The crank permission system of claim 1 further comprising a transmission control module that determines the first gear range.

8. The crank permission system of claim 7 wherein, when the ignition system of the vehicle transitions to crank, the first permission module generates the first permission signal when the first gear range is in one of park and neutral.

9. A method for permitting cranking of an engine, the method comprising:
when an ignition system of a vehicle transitions to crank, selectively generating a first permission signal based on a first gear range engaged within a transmission;
when the ignition system of the vehicle transitions to crank, selectively generating a second permission signal based on: (i) the first gear range stored when the ignition system last transitioned to off; (ii) a second gear range of the transmission requested by a driver using a transmission range selector; (iii) whether the first gear range is invalid when the ignition system of the vehicle transitions to crank; and (iv) the first gear range before the engine last transitioned to off; and
cranking the engine via a starter in response to the generation of the first permission signal and the generation of the second permission signal.

10. The method of claim 9 further comprising:
determining whether the first gear range is invalid when the ignition system transitions to crank.

11. The method of claim 10 further comprising:
determining the first gear range when the engine last transitioned to off.

12. The method of claim 11 further comprising:
determining whether the engine was running when the first gear range reached park before when the ignition system last transitioned to off.

13. The method of claim 12 wherein selectively generating the second permission signal includes selectively generating the second permission signal when all of:
(i) the first gear range stored when the ignition system last transitioned to off is park;
(ii) the second gear range of the transmission requested by the driver is one of park and neutral;
(iii) the first gear range is invalid and is not one of park, neutral, drive, reverse, and low;
(iv) the first gear range when the engine last transitioned to off is park; and
(v) the engine was running when the first gear range reached park before when the ignition system last transitioned to off.

14. The method of claim 13 wherein selectively generating the second permission signal includes not generating the second permission signal when at least one of:
(vi) the first gear range stored when the ignition system last transitioned to off is not park;
(vii) the second gear range of the transmission requested by the driver is not one of park and neutral;
(viii) the first gear range is one of park, neutral, drive, reverse, and low;
(ix) the first gear range when the engine last transitioned to off is not park; and
(x) the engine was not running when the first gear range reached park before when the ignition system last transitioned to off.

15. The method of claim 9 further comprising cranking the engine after the generation of at least one of the first and second permission signals has stopped.

16. The method of claim 9 further comprising determining the second gear range of the transmission requested by the driver based on at least one position of the transmission range selector.

17. The method of claim 9 wherein generating the first permission signal includes generating the first permission signal when the first gear range is one of park and neutral.

* * * * *